Aug. 5, 1969   P. H. SIJBRING   3,460,162
METHOD FOR PEELING POTATOES OR SIMILAR TUBERS, BULBS, ROOTS, OR FRUITS AND AN APPARATUS FOR CARRYING OUT THIS METHOD
Filed May 22, 1967

United States Patent Office  3,460,162
Patented Aug. 5, 1969

3,460,162
METHOD FOR PEELING POTATOES OR SIMILAR TUBERS, BULBS, ROOTS, OR FRUITS AND AN APPARATUS FOR CARRYING OUT THIS METHOD
Pieter Herman Sijbring, Rhenen, Netherlands, assignor to Instituut voor Bewaring en Verwerking van Landbouwprodukten, Wageningen, Netherlands
Filed May 22, 1967, Ser. No. 640,057
Claims priority, application Netherlands, May 25, 1966, 6607226
Int. Cl. A23n 7/02, 13/00
U.S. Cl. 146—225                                          10 Claims

ABSTRACT OF THE DISCLOSURE

Tubers, such as potatoes, or other fruit or vegetables are peeled by being fed into a rotating drum having a plurality of rollers with abrasive surfaces of bristles or other projections, parallel to, and equidistant from the axis of the drum, the rollers being close together and each rotating about its own axis so that, at the outer portion of the rotating rollers, the sum of the centrifugal forces generated by the rotation of the drum and the rotation of the rollers is great enough to cast the peels outwardly while at the inner portion of the rollers the difference between these two forces is small enough that the peels are retained on the roller surfaces.

BACKGROUND OF THE INVENTION

This invention relates to a method of peeling produce such as fruit, potatoes or other tubers, bulbs or roots, and apparatus for performing the method.

One way to peel large quantities of fruits or vegetables is to feed them into a horizontal or slightly inclined drum having a number of abrasive rollers which surround the axis of the drum and which have axes equidistant from the axis of the drum. The drum is rotated about its axis to cause the vegetables or fruit being peeled to repeatedly come into contact with the abrasive rollers and the rollers are rotated to effect peeling. An apparatus for peeling vegetables in this manner is shown in U.S. Patent 3,134,413 issued to F. J. Dorsa et al.

The principal advantage of such a method is that it can be performed continuously to peel produce at a production rate which is higher than in a "batch-type" operation where the peeling operation must be shut down intermittently to remove the peels. It is possible to peel continuously because the peels can be removed from the peeled fruits or vegetables by using water to flush the peels between the abrasive rollers and outwardly away from the fruit or vegetable matter being peeled.

Such a method is not without disadvantages. For one, disposal of the waste water is often difficult and expensive because it is polluted with considerable amounts of peels and must be purified before being discharged from the processing plant. One way in which such waste water has been purified is by fermenting the peels, but such a process is particularly expensive because of the large quantities of peels which are removed from the produce. In the case of tubers, for example, the weight of the peels is generally more than fifteen (15%) percent of that of the treated tuber.

Another disadvantage of such an operation is that while peels which are flushed out at the lower portion of the drum are easily led away, those flushed out at the upper portion of the drum can fall back through the rollers into the mass of produce being processed. As a result, the production rate is lowered substantially and the amount of water necessary to wash the peels free is increased.

SUMMARY OF THE INVENTION

It is an object of the present invention to obviate the necessity of using water to carry off peels removed from produce in an operation where the produce is fed into a revolving drum which has a plurality of rotating abrasive rollers positioned around the axis of the drum. To this end, the sum of the centrifugal accelerating forces generated by the rotation of the drum and the rotation of the rollers is made sufficiently large at the outer portion of the rollers to cast off the peels while, at the inner portion of the rollers, the difference between said forces is small enough so that the peels are retained on the rollers.

It is another object of this invention to prevent peels which are cast away from the upper portion of the drum from falling back into the drum to adversely affect the peeling operation. To this end, scrappers are provided to carry peels ejected from the upper portion of the drum to an outlet below the drum.

DESCRIPTION OF THE PREFERRED EMBODIMENT

Figure 1:
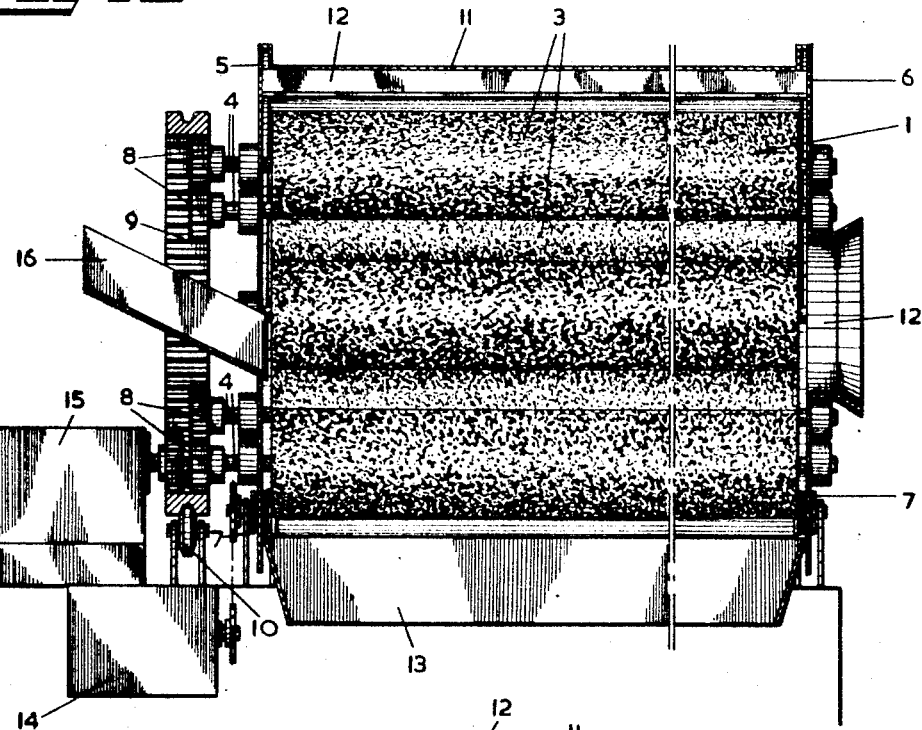
FIG. 1 is a vertical section of a preferred embodiment of the apparatus of the present invention.
Figure 2:
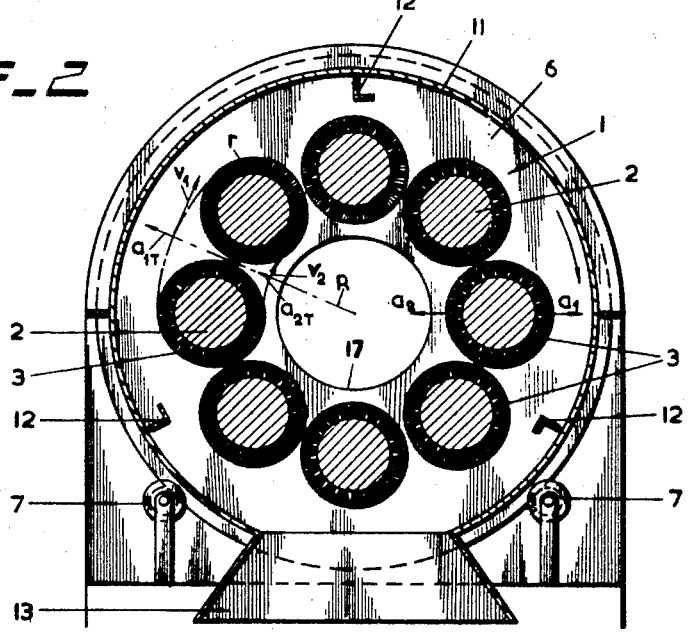
FIG. 2 is a vertical section taken substantially along the line 2—2 of FIG. 1.

There is shown in FIGS. 1 and 2 a drum 1 which has, positioned about its axis, a plurality of rollers 2. The rollers 2 are equidistant from the axis of the drum, are spaced close together, and are provided with bristles or projections 3 at their peripheral surfaces to give the rollers an abrasive quality. The rollers 2 are mounted on shafts 4 which are rotatably mounted in circular flanges 5 and 6. The flanges 5 and 6 are supported at their peripheries on wheels 7 which, as shown best, perhaps, in FIG. 2, are rotatably mounted on brackets which are supported by the frame of the apparatus. The wheels 7 allow the flanges 5 and 6, and therefore the entire drum 1, to rotate about the axis of the drum 1 without the presence of a central shaft in the drum.

Secured on one end of each of the roller shafts 4 is a gear wheel 8 each of which meshes with the ring gear 9, as shown in FIG. 1. The ring gear 9 is supported on wheels 10 which are rotatably mounted on brackets which are supported by the frame of the apparatus and engage the ring gear 9 at a groove which extends about the periphery of the ring gear. The drum rotates within a fixed housing 11. Extending between the flanges 5 and 6 and outwardly of the rollers 2 are scrapers 12, the purpose of which will be explained presently. At the lower portion of the housing 11 is an outlet 13.

The drum is rotated by means of a driving and transmission unit 14 which drives one or both of the wheels 7 through a pulley and belt arrangement as shown in FIG. 1. Rotation of a wheel 7, of course, imparts a rotation to the drum 1 through the circular flanges 5 and 6 because the flanges are supported at their peripheries on the wheels 7.

The rotational speeds of the rollers is controlled by the relative rotational speeds of the drum and the ring gear 9. The ring gear 9 is driven by a transmission unit 15 which drives a gear in mesh with the ring gear 9 as shown in FIG. 1.

A feeding chute 16 is provided to direct the tubers or the like to be peeled into the drum 1 and, after being peeled, pass out of the drum via an outlet 17.

In operation, the transmissions 14 and 15 rotate the drum 1 and rollers 2 while the tubers or the like which may have been previously treated with lye or steam to soften their peels are fed into the drum through the feeding chute 16.

The rotational speed of the drum is chosen so that the centrifugal force on the tubers or other produce being peeled is smaller than gravity so that the tubers or the like are carried up the side of the drum and then fall back on themselves. This tumbling action allows the tubers to clean each other and, even more importantly, they are constantly mixed to assure that the entire surface of each tuber is acted upon by the abrasive surfaces of the rollers 2 to result in the removal of the entire peel of each tuber.

The drum 1 is shown in the drawing as horizontally mounted but, if desired, it may be inclined slightly to urge the produce being peeled through the drum 1.

The peels are removed from the tubers or the like by the abrasive action of the rollers 2 at the inner portions of the rollers and are retained on the rollers until they are at the outer portion of the rollers where they are cast outwardly away from the drum. It is this feature which allows the present peeling operation to be performed with little or no water to flush peels out of the drum. In practice, it has been found that 70–80% of the peels can be removed and carried away in dry condition.

As explained supra, the centrifugal force on the tubers or the like must be less than gravity. Therefore, centrifugal acceleration of the tubers must be less than the acceleration of gravity. In mathematical terms:

$$\frac{V^2}{R} \leq 9.81$$

where $V$ is the circumferential speed of the drum at the innermost points on the rollers and $R$ is the corresponding radius (see FIG. 2).

Since $$V = \frac{\pi \cdot R \cdot n}{30} \text{ m./sec.}$$

where $n$ designates the rotational speed of the drum in r.p.m., it can be calculated that $$n \leq 30 \sqrt{\frac{1}{R}} \qquad (1)$$

During the rotary movement of the drum 1 the rollers 2 also rotate, the rotational speed of the rollers 2 is controlled by the transmission 15 which acts on the toothed ring 9. Consequently the peels on the rollers are acted upon by centrifugal accelerating forces due to the rotation of the drum, as well as by centrifugal accelerating forces due to the rotation of the rollers. In FIG. 2, the radial accelerations acting on the outermost point and the innermost point, respectively, of a roller on a line connecting the centers of the drum and the roller are designated as $a_1$ and $a_2$ respectively. $a_1$ and $a_2$ are so chosen that the peels abraded by the bristles or projections 3 are delivered only on the outside of the drum 1 and adhere to the rollers 2 on the inside thereof.

The centrifugal acceleration required for hurling the peels off the rollers 2 is dependent upon the adhesive and clamping forces with which the peels are held on or between the bristles or projections. These adhesive and clamping forces in turn are largely dependent upon the nature of the peels. The required centrifugal acceleration, however, will, in general, fall in the range of 150 to 400 m./sec.²

According to the invention, $a_1-a_2$ must be at least 10 m./sec.² and preferably at least 20 m./sec.² From this requirement follows a second condition which must be satisfied by the number of r.p.m. of the drum. In fact, the said difference is equal to the sum of the accelerations generated by the rotation of the drum on the outside and the inside of the roller ($a_{1T}$ and $a_{2T}$ respectively). In other words $$a_{1T} + a_{2T} \geq 10 \text{ m./sec.}^2$$

Now we have $$a_{1T} = \frac{V_1^2}{R+2r}$$

and $$a_{2T} = \frac{V_2^2}{R}$$

in which $V_1$ designates the circumferential velocity of the drum at the outside of a roller in m./sec. and $V_2$ designates the circumferential velocity of the drum at the inner portion of a roller in m./sec., and $r$ designates the radius of the rollers in meters.

The following equations are self-evident:

$$V_1 = \frac{\pi \cdot (R+2r) n}{30}$$

and $$V_2 = \frac{\pi \cdot R \cdot n}{30}$$

By substitution the following equation can be formulated:

$$\frac{\pi^2 \cdot (R+2r)^2 \cdot n^2}{900(R+2r)} + \frac{\pi^2 \cdot R^2 \cdot n^2}{900R} \geq 10 \text{ m./sec.}^2$$

from which it follows that $$n \geq 20 \sqrt{\frac{1}{R+r}} \qquad (2)$$

Combination of the conditions (1) and (2) gives:

$$20 \sqrt{\frac{1}{R+r}} \leq n \leq 30 \sqrt{\frac{1}{R}}$$

Although the accelerating forces experienced by the peels are independent of the directions of rotation of the drum and rollers, it is preferable for the drum and rollers to rotate in the same direction.

After being cast out of the drum 1, peels which happen to be thrown off of a roller 2, at the upper portion of the drum are prevented from falling back into the drum to reduce the efficiency of the operation by the action of the scrapers 12. The scrapers 12 extend between the flanges 5 and 6 to rotate therewith and carry peels from the space above the drum and under the housing 11 to the space below the drum and eventual discharge through the outlet 13.

Now follows an example of the effectiveness of the present invention in reducing the amount of water required to assure separation of peels from potatoes from which they were removed.

Potatoes, of the Bintje variety, were washed at the rate of 2,900 kg. per hour in a potato washer and subsequently immersed for 5.5 minutes in a lye tank containing a caustic soda solution of 19% by weight at a temperature of 66° C.

The potatoes thus treated were then passed through the present apparatus wherein $R=0.195$ m., $r=0.105$ m., $n$ drum $= 58$ r.p.m., $n$ bristles $= 430$ r.p.m.

The potatoes thus peeled were practically completely clean. With a view to removing the alkalinity and the last traces of peel from the surface of the potatoes, the potatoes were washed once more, 4.3 m.³ of waste water per hour with B.O.D. 400 being produced.

The same quantity was fed at the same rate into a conventional water jet machine, in which the peels were sprayed off the potatoes. In this case, 32 m.³ of waste water per hour with B.O.D. 600 was produced.

The acceleration required for hurling the peels off of the rollers can be considerably lowered by feeding into the drum dry, finely divided material such as dried pulverized peels.

If the peels are to be used for fodder, the finely divided material added will have to be suitable for feeding livestock. If they are to be used as fertilizers, the materials added will likewise be appropriate as, for example, peat moss, sawdust or sand.

It will be apparent that the foregoing does not treat every possible embodiment of the present invention and that numerous modifications, substitutions, additions and subtractions could be made thereto without departing from the scope of the present invention as defined in the following claims.

I claim:

1. A method for peeling produce such as fruits, vegetables such as potatoes or other tubers or bulbs using little or no water to carry away peels comprising the steps of feeding said produce into a substantially horizontal drum having a plurality of rollers with abrasive peripheral surfaces arranged equidistant from the axis of said drum, and rotating said drum and said rollers about their respective axes to peel said produce with said abrasive surfaces and at rotational speeds so that on the outside of the rollers the sum of the centrifugal accelerating forces generated by the rotation of the drum and the rotation of the rollers respectively is large enough to cause peels retained on the rollers to move outwardly from the rollers, while on the inside of said rollers the difference between said centrifugal accelerating forces is sufficiently small to hold said peels on said rollers.

2. The method defined in claim 1 wherein the drum is rotated at a speed where the centrifugal acceleration of the drum at the outermost points on said rollers is at least 10 m./sec.² greater than the centrifugal acceleration of said drum at the innermost points on said rollers, so that the number of r.p.m. of the drum is at least equal to $$20\sqrt{\frac{1}{R+r}}$$

where R represents the radius of the drum at the innermost points on said rollers, in meters, and $r$ the radius of said rollers in meters.

3. The method defined in claim 1 wherein said drum is rotated at a speed where the centrifugal acceleration of the drum at the outermost point on said rollers is at least 20 m./sec.² greater than the centrifugal acceleration of said drum at the innermost points on said rollers.

4. The method defined in claim 2 wherein the produce is treated with steam or lye to soften the peels thereon before being fed into said drum.

5. The method defined in claim 2 further comprising the step of adding a dry, finely divided material, such as dried pulverized peels, peat moss, sawdust, or sand to the produce in the drum.

6. The method defined in claim 2 wherein the rollers and drum are rotated in the same direction.

7. Apparatus for peeling produce such as potatoes or other tubers, roots and fruit comprising a substantially horizontal rotatable drum, a plurality of rollers having peripheral abrasive surfaces rotatably mounted about the axis of said drum and equidistant from said axis, means to rotate said drum and rollers about their respective axes, a housing enclosing a portion of said drum, said housing containing an outlet for peels removed from said produce, and means to convey peels from the space between said drum and said housing to said outlet.

8. The apparatus defined in claim 7 wherein said outlet is at the lower portion of said housing and said means is at least one scraper rotating about the axis of said drum adjacent to said housing.

9. The apparatus defined in claim 8 wherein said drum has two circular end flanges, said rollers are rotatably mounted between said end flanges and said scraper extends between said end flanges., 10. The apparatus defined in claim 9 wherein said abrasive surface is of bristles or projections.

References Cited

UNITED STATES PATENTS

| | | | |
|---|---|---|---|
| 3,134,413 | 5/1964 | Dorsa et al. | 146—49 |
| 3,192,974 | 7/1965 | Hickey et al. | 146—50 |

W. GRAYDON ABERCROMBIE, Primary Examiner

U.S. Cl. X.R.

146—49, 226, 231